United States Patent [19]

Groom et al.

[11] 4,281,384
[45] Jul. 28, 1981

[54] RIM INERTIAL MEASURING SYSTEM

[75] Inventors: Nelson J. Groom, White Marsh; Williard W. Anderson, Yorktown; William H. Phillips, Hampton, all of Va.

[73] Assignee: The United States of America as represented by the Administrator of the National Aeronautics and Space Administration, Washington, D.C.

[21] Appl. No.: 102,002

[22] Filed: Dec. 7, 1979

[51] Int. Cl.³ .............................................. G01C 23/00
[52] U.S. Cl. .................................. 364/453; 364/566; 73/178 R; 73/510
[58] Field of Search ............... 364/453, 454, 566, 565; 73/178 R, 504, 510, 511; 33/321; 324/162, 173, 179

[56] References Cited

U.S. PATENT DOCUMENTS

| | | | |
|---|---|---|---|
| 3,483,746 | 12/1969 | Bers | 73/178 R |
| 3,559,478 | 2/1971 | Iberall | 364/453 |
| 3,974,699 | 8/1976 | Morris et al. | 73/510 |
| 4,125,017 | 11/1978 | Dhuyvetter | 73/178 R |
| 4,156,548 | 5/1979 | Anderson et al. | 73/178 R |
| 4,179,818 | 12/1979 | Craig | 73/178 R |
| 4,197,737 | 4/1980 | Pittman | 73/178 R |
| 4,212,443 | 7/1980 | Duncan et al. | 73/178 R |
| 4,214,482 | 7/1980 | Bouchard | 73/504 |

*Primary Examiner*—Felix D. Gruber
*Assistant Examiner*—Gary Chin
*Attorney, Agent, or Firm*—Howard J. Osborn; John R. Manning; William H. King

[57] ABSTRACT

An annular momentum control device (AMCD) 11 is operated in a strapped down position on a spacecraft. The signals from the position sensors 18 and 19 at the several AMCD magnetic bearing stations a, b, and c are applied to computers (FIGS. 4 and 5) which compute the angular rate about first and second axes in the plane of the AMCD rim 12 and compute the linear accelerations along the first and second axes and along a third axis perpendicular to the first and second axes.

10 Claims, 5 Drawing Figures

RIM INERTIAL MEASURING SYSTEM

ORIGIN OF THE INVENTION

The invention described herein was made by employees of the United States Government and may be used by or for the Government for governmental purposes without the payment of any royalties thereon or therefor.

BACKGROUND OF THE INVENTION

The invention relates generally to an inertial measuring system and more specifically concerns an inertial measuring system for measuring angular rate and linear accelerations that uses an annular momentum control device (AMCD) as the basic sensor.

There are numerous devices that will measure angular rates and linear accelerations. These devices are known as inertial measurement units in their basic form and as inertial navigation units in their more complex form. The disadvantages of these prior art devices are that they are complex, occupy a large volume, sometimes unreliable, have low momentum-to-mass ratios, have friction between moving parts which results in wear of the parts, and they require separate sensor elements for measuring angular rate and linear acceleration.

It is the primary object of this invention to provide an apparatus for measuring both angular rates and linear accelerations with a single multisensing device.

Another object of the invention is to provide a device for measuring angular rates and linear accelerations that is simple, reliable, has zero-friction, has zero-wear, low volume, has high momentum-to-mass ratio and has zero breakout forces.

Other objects and advantages of this invention will become apparent hereinafter in the specification and in the drawings.

SUMMARY OF THE INVENTION

The invention includes an AMCD having a rim and several magnetic bearing stations. The AMCD is in a strapped down position on a spacecraft. Each magnetic bearing station comprises means, including an axial position sensor, for controlling the position of the rim in the axial direction; and means, including a radial position sensor, for controlling the position of the rim in the radial direction. A first computer receives the signals from all the axial position sensors and computes the angular rates about first and second mutually perpendicular axes in the plane of the rim and computes the linear acceleration along a third axis perpendicular to the first and second axes. A second computer receives the signals from all the radial position sensors and computes the linear accelerations along the first and second axes.

DETAILED DESCRIPTION OF THE INVENTION

Figure 1:
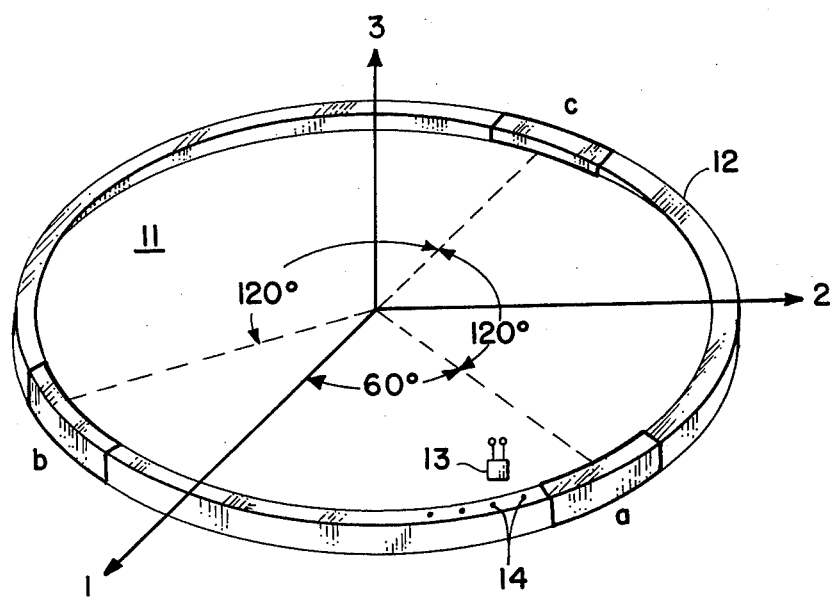
FIG. 1 is a schematic drawing of the AMCD used in the embodiment of the invention selected for illustration in the drawings.

Turning now to the embodiment of the invention selected for illustration in the drawings, the number 11 in FIG. 1 designates an AMCD that is fixed relative to the spacecraft on which the invention is used. AMCD 11 includes a rim 12 with three magnetic bearing suspension stations a, b, and c located 120° apart around the rim. Stator means 13 located on opposite sides of rim 11 and fixed relative to the spacecraft, and permanent magnets 14 (only four are shown) extending through the rim provides means for spinning rim 11. Rim 11 is spinning continuously at a constant speed throughout the operation of this invention. Three mutually perpendicular axes 1, 2, and 3 are shown in FIG. 1. The origin for these axes is at the center of AMCD 11 with axes 1 and 2 in the plane of the AMCD and with axes 1 being 60° from a line drawn from the center of the AMCD to the center of magnetic bearing station a. This invention measures the angular rates about axes 1 and 2 and the linear accelerations along axes 1, 2 and 3.

Figure 2:
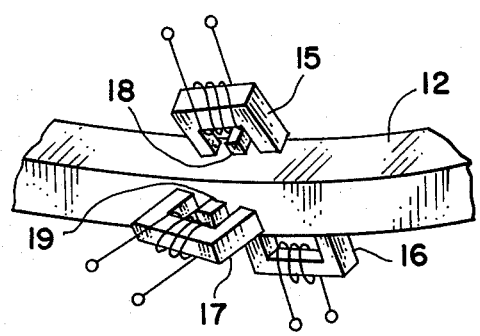
FIG. 2 is a schematic drawing of an AMCD magnetic bearing station.

At each of the magnetic bearing stations, as shown in FIG. 2, electromagnets 15 and 16 are located on opposite sides of rim 12 to control it in the axial direction, and an electromagnet 17 controls the rim in the radial direction. A position sensor 18 produces a signal indicative of the position of the rim in the axial direction and a position sensor 19 produces a signal indicative of the position of the rim in the radial direction. Position sensors 18 and 19, which are commercially available, are each a transducer that produces a signal proportional to the distance from the transducer to rim 12. Electromagnets 15, 16 and 17, and position sensors 18 and 19 are all fixed relative to the spacecraft.

Figure 3:
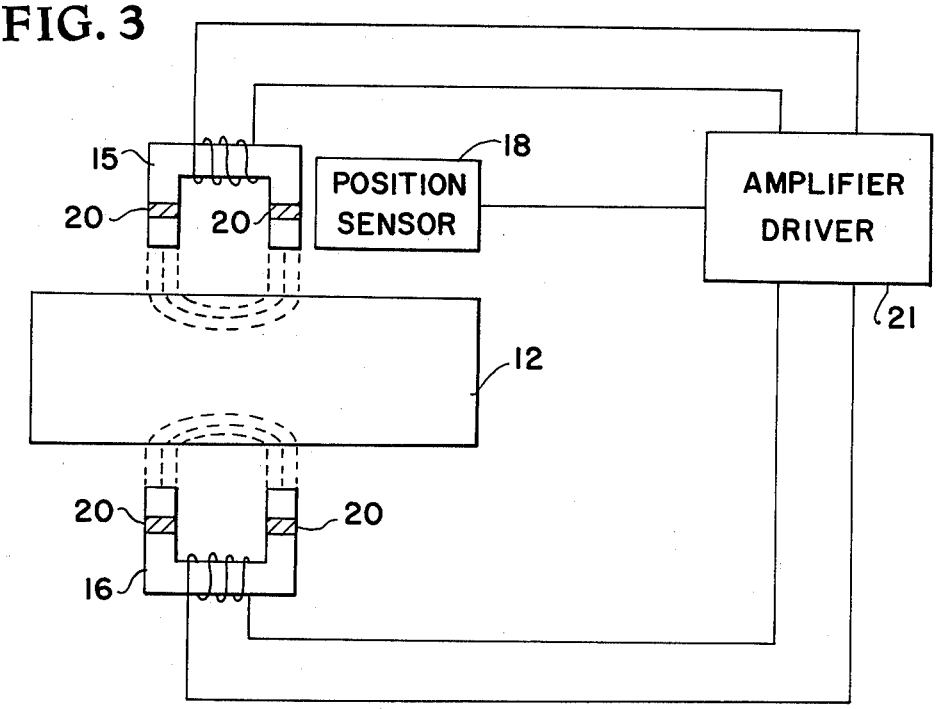
FIG. 3 is a drawing of the circuitry used for controlling the position of the AMCD rim in the axial direction.

Electromagnets 15 and 16, are connected in an axial control circuit as shown in FIG. 3. The electromagnets are shown with a permanent magnet material 20 in series with the core magnetic circuit to produce a permanent field component in the bearing element air gaps to suspend the rim in its zero position. Any movement of rim 12 in the axial direction is sensed by position sensor 18 which produces a signal that commands an amplifier driver 21 which controls in opposite directions the currents in the coils of electromagnets 15 and 16. If rim 12 is displaced downward, the motion is sensed by position sensor 18 which produces a signal that commands amplifier driver 21. The amplifier driver drives electromagnet 15 in a direction to aid the permanent magnetic field thus increasing the magnetic flux in the air gaps of electromagnet 15. At the same time the amplifier driver drives electromagnet 16 in a direction to subtract from the permanent field thus reducing the magnetic flux in the air gaps of electromagnet 16. Since the force on the suspended rim is proportional to the square of the magnetic flux in the air gaps of a particular bearing element, a net restoring force is produced which tends to return the rim to its zero position. Damping of the suspended rim can be achieved by deriving a rate signal from the position sensor signal and then summing the two signals to feed the amplifier driver. The radial magnetic bearings work in the same manner as that shown in FIG. 3 if there is an even number of magnetic bearing stations. In that case, the electromagnets 17 from two opposite magnetic bearing stations would be used as shown in FIG. 3. If, as in the described embodiment of the invention, there is an odd number of magnetic bearing stations the circuitry shown in FIG. 3 is used for each station with the lower electromagnet eliminated.

In this invention the six analog signals produced by the two position sensors located at each of the three magnetic bearing stations are used to compute the angular rates about axes 1 and 2 and the linear accelerations along axes 1, 2 and 3 in FIG. 1. To understand how these computations are made, consider the following equations of motion. The rotational equations of motion for the AMCD-spacecraft system (using small angle and rate assumptions) are $$\begin{Bmatrix} \ddot{\theta}_{A1} \\ \ddot{\theta}_{A2} \\ \ddot{\theta}_{S1} \\ \ddot{\theta}_{S2} \\ \ddot{\theta}_{S3} \end{Bmatrix} = \begin{Bmatrix} (1/I_A)(G_{A1} - \dot{\theta}_{A2}H_A) \\ (1/I_A)(G_{A2} + \dot{\theta}_{A1}H_A) \\ (1/I_{S1})(G_{S1} + E_{S1}) \\ (1/I_{S2})(G_{S2} + E_{S2}) \\ (1/I_{S3})(E_{S3}) \end{Bmatrix} \quad (1)$$

where $\theta_{A1}$ and $\theta_{A2}$ are AMCD Euler angles with respect to inertial space; $\theta_{S1}$, $\theta_{S2}$, and $\theta_{S3}$ are spacecraft Euler angles with respect to inertial space; $I_A$ is the transverse moment of inertia of the AMCD rim; $I_{S1}$, $I_{S2}$, and $I_{S3}$ are spacecraft moments of inertia; $G_{A1}$ and $G_{A2}$ are torques acting about the center of mass of the ACMD rim produced by the magnetic bearings; $G_{S1}$ and $G_{S2}$ are reaction torques on the spacecraft produced by motion of the ACMD rim acting through the magnetic bearings; $E_{S1}$, $E_{S2}$, and $E_{S3}$ are external disturbance torques acting on the spacecraft; $H_A$ is the stored momentum of the AMCD rim about the spin axis; and { } is a column vector. The translational equations are $$\begin{Bmatrix} \ddot{r}_{CA1} \\ \ddot{r}_{CA2} \\ \ddot{r}_{CA3} \\ \ddot{r}_{CS1} \\ \ddot{r}_{CS2} \\ \ddot{r}_{CS3} \end{Bmatrix} = \begin{Bmatrix} (1/m_A)F_{A1} \\ (1/m_A)F_{A2} \\ (1/m_A)F_{A3} \\ (1/m_S)F_{S1} \\ (1/m_S)F_{S2} \\ (1/m_S)F_{S3} \end{Bmatrix} \quad (2)$$

where $r_{CA1}$, $r_{CA2}$, and $r_{CA3}$ are components of the vector which locates the AMCD rim center of mass with respect to the origin of the inertial coordinate system; $r_{CS1}$, $r_{CS2}$, and $r_{CS3}$ are components of the vector which locates the spacecraft center of mass with respect to the origin of the inertial coordinate system; $F_{A1}$, $F_{A2}$, and $F_{A3}$ are translational forces on the AMCD rim (in AMCD axes) produced by the magnetic bearings; $F_{S1}$, $F_{S2}$, and $F_{S3}$ are the total translational forces on the spacecraft (in spacecraft axes) which includes the forces produced by the magnetic bearings; and $m_A$ and $m_S$ are the masses of the AMCD rim and spacecraft, respectively. In this invention, the AMCD is used as a sensing device only and consequently will be made as small as possible. The reaction torques on the spacecraft ($G_{S1}$ and $G_{S2}$), and translational forces (elements of $F_{S1}$, $F_{S2}$, and $F_{S3}$), produced by motion of the AMCD rim acting through the magnetic bearings can be ignored in this case and the spacecraft equations of motion become uncoupled from the AMCD equations of motion. By assuming the center of mass of the AMCD to be coincident with the center of mass of the spacecraft, the axial magnetic bearing gaps, in terms of rotations and translations, can be written as $$\begin{Bmatrix} g_{Xa} \\ g_{Xb} \\ g_{Xc} \end{Bmatrix} = \begin{bmatrix} (\sqrt{3}/2)r_m & -(\tfrac{1}{2})r_m & 1 \\ -(\sqrt{3}/2)r_m & -(\tfrac{1}{2})r_m & 1 \\ 0 & r_m & 1 \end{bmatrix} \begin{Bmatrix} \theta_{AS1} \\ \theta_{AS2} \\ r_{CAS3} \end{Bmatrix} \quad (3)$$

where $g_{Xa}$, $g_{Xb}$, and $g_{Xc}$ are the axial gaps for bearing stations a, b, and c, respectively; $r_m$ is the radius of the AMCD rim; [ ] is a rectangular matrix; and $\theta_{AS1}$, $\theta_{AS2}$, and $r_{CAS3}$ are defined as $$\begin{Bmatrix} \theta_{AS1} \triangleq [\theta_{A1} - \theta_{S1}] \\ \theta_{AS2} \triangleq [\theta_{A2} - \theta_{S2}] \\ r_{CAS3} \triangleq [r_{CA3} - r_{CS3}] \end{Bmatrix} \quad (4)$$

The radial gaps in terms of translations can be written as $$\begin{Bmatrix} g_{Ra} \\ g_{Rb} \\ g_{Rc} \end{Bmatrix} = \begin{bmatrix} \tfrac{1}{2} & \sqrt{3}/2 \\ \tfrac{1}{2} & -\sqrt{3}/2 \\ -1 & 0 \end{bmatrix} \begin{Bmatrix} r_{CAS1} \\ r_{CAS2} \end{Bmatrix} \quad (5)$$

where $g_{Ra}$, $g_{Rb}$, and $g_{Rc}$ are the radial gaps for bearing stations a, b, and c, respectively and $r_{CAS1}$ and $r_{CAS2}$ are defined as $$\begin{Bmatrix} r_{CAS1} \triangleq [r_{CA1} - r_{CS1}] \\ r_{CAS2} \triangleq [r_{CA2} - r_{CS2}] \end{Bmatrix} \quad (6)$$

It should be noted that the assumption that the ACMD and spacecraft centers of mass are coincident was made only to simplify the equations for the present development. The general AMCD-spacecraft equations of motion are for an arbitrary location of the AMCD center of mass with respect to the spacecraft center of mass. The torques on the rim due to axial bearing forces are $$\begin{Bmatrix} G_{A1} \\ G_{A2} \end{Bmatrix} = \begin{bmatrix} (\sqrt{3}/2)r_m & -(\sqrt{3}/2)r_m & 0 \\ -(\tfrac{1}{2})r_m & -(\tfrac{1}{2})r_m & r_m \end{bmatrix} \begin{Bmatrix} F_{Xa} \\ F_{Xb} \\ F_{Xc} \end{Bmatrix} \quad (7)$$

The radial forces resolved along the 1 and 2 axes are $$\begin{Bmatrix} F_{R1} \\ F_{R2} \end{Bmatrix} = \begin{bmatrix} \tfrac{1}{2} & \tfrac{1}{2} & -1 \\ \sqrt{3}/2 & -\sqrt{3}/2 & 0 \end{bmatrix} \begin{Bmatrix} F_{Ra} \\ F_{Rb} \\ F_{Rc} \end{Bmatrix} \quad (8)$$

where $F_{R1}$ and $F_{R2}$ are forces on the rim along the 1 and 2 axes and $F_{Ra}$, $F_{Rb}$, and $F_{Rc}$ are the radial forces produced by bearing stations a, b, and c respectively. The rim rotational and axial translational dynamics are (from equations (1) and (2))

$$\begin{Bmatrix} \ddot{\theta}_{A1} \\ \ddot{\theta}_{A2} \\ \ddot{r}_{CA3} \end{Bmatrix} = \begin{Bmatrix} 1/I_A \ (G_{A1} - \dot{\theta}_{A2}H_A) \\ 1/I_A \ (G_{A2} + \dot{\theta}_{A1}H_A) \\ 1/I_A \ F_A \end{Bmatrix} \quad (9)$$

where $$F_A = F_{Xa} + F_{Xb} + F_{Xc} \quad (10)$$

Finally, the radial translational dynamics become (from equation (2))

$$\begin{Bmatrix} \ddot{R}_{CA1} \\ \ddot{r}_{CA2} \end{Bmatrix} = (1/m_A) \begin{Bmatrix} F_{r1} \\ F_{R2} \end{Bmatrix} \quad (11)$$

The AMCD utilized in the present invention has a magnetic bearing suspension system which provides active positioning control of the rim in both the axial and radial directions. The axial and radial suspension systems are independent and are designed separately.

The magnetic bearing actuators selected for the disclosed embodiment of the invention utilize permanent magnet flux-biasing. For small motions about a given operating point, the magnetic bearing force as a function of electromagnetic current and rim displacement with respect to the operating point can be written as $$F = K_B i + K_m g \quad (12)$$

where $K_B$ is an equivalent electromagnet gain, i is electromagnet current, $K_m$ is an equivalent permanent magnet stiffness, and g is gap displacement about a nominal operating point.

The axial magnetic suspension control system approach selected for the present invention is one that uses independent control loops for each suspension station. At zero rim spin speed (zero momentum), for three magnetic bearing suspension stations spaced equidistantly around the rim and for theoretical rim inertia distribution, it can be shown that axial motions of the rim in each of the bearing stations are uncoupled. That is, axial motion of the rim in one bearing produces no motion in the other two bearings. Consequently, at zero momentum the axial magnetic bearing control system can be represented as three identical independent systems and a single design, using a simplified suspended mass model, can be performed. Using this design approach, the closed loop magnetic bearing control system parameters required to produce desired system performance at a given rim momentum are obtained.

In order to illustrate this approach, assume that the electromagnet current in equation (12) is a function of rim position error and error rate. The force as a function of gap error can then be written as $$F = K_B(K_A + K_R s)(g_C - g) + K_m g \quad (13)$$

where $K_A$ is a position gain, $K_R$ is a rate gain, and $(g_C - g)$ is the rim position error signal where $g_C$ is a gap command and g is the actual signal. Taking the Laplace transform of equation (9) and rearranging results in $$\begin{bmatrix} I_A s^2 & H_A s & 0 \\ -H_A s & I_A s^2 & 0 \\ 0 & 0 & m_A s^2 \end{bmatrix} \begin{Bmatrix} \theta_{A1} \\ \theta_{A2} \\ r_{CA3} \end{Bmatrix} = \begin{Bmatrix} G_{A1} \\ G_{A2} \\ F_A \end{Bmatrix} \quad (14)$$

In order to simplify the terms in the following development, define $$[A] \triangleq \begin{bmatrix} I_A s^2 & H_A s & 0 \\ -H_A s & I_A s^2 & 0 \\ 0 & 0 & m_A s^2 \end{bmatrix} \quad (15)$$

and $$[T] \triangleq \begin{bmatrix} (\sqrt{3}/2)r_m & -(\tfrac{1}{2})r_m & 1 \\ -(\sqrt{3}/2)r_m & -(\tfrac{1}{2})r_m & 1 \\ 0 & r_m & 1 \end{bmatrix} \quad (16)$$

Equation (14) becomes $$[A] \begin{Bmatrix} \theta_A \\ r_{CA3} \end{Bmatrix} = \begin{Bmatrix} G_A \\ F_{R1} \end{Bmatrix} = [T]^T \{F_X\} \quad (17)$$

where $[\ ]^T$ is the transpose of $[\ ]$. Substituting from equation (13) results in $$[A] \begin{Bmatrix} \theta_A \\ r_{CA3} \end{Bmatrix} = K_B(K_A + K_R s)[T]^T(\{g_{Xc}\} - \{g_X\}) + K_m[T]^T\{g_X\} \quad (18)$$

The equations of motion for the radial system are somewhat simpler than the axial system since momentum coupling is not involved. From equation (2)

$$\begin{Bmatrix} \ddot{r}_{CA1} \\ \ddot{r}_{CA2} \end{Bmatrix} = (1/m_A) \begin{Bmatrix} \bar{F}_{R1} \\ \bar{F}_{R2} \end{Bmatrix} \quad (19)$$

where $\bar{F}_{R1}$ and $\bar{F}_{R2}$ are defined in equation (8). In order to simplify the terms in the following development define $$[M] = \begin{bmatrix} \tfrac{1}{2} & \sqrt{3}/2 \\ \tfrac{1}{2} & -\sqrt{3}/2 \\ -1 & 0 \end{bmatrix} \quad (20)$$

Making the electromagnet current a function of rim position error and error rate, the force produced by a given radial bearing can be written as $$F_R = K_{BR}(K_{AR} + K_{RR}s)(g_{RC} - g_R) + K_{mR}g_R \quad (21)$$

where $K_{AR}$ is radial position gain, $K_{RR}$ is radial rate gain, $K_{BR}$ is the equivalent electromagnet gain, $K_{mR}$ is the equivalent permanent magnet stiffness, and $(g_{RC} - g_R)$ is the rim radial position error signal where $g_{RC}$ is a rim radial gap command and $g_R$ is the actual radial gap signal. Using equation (6), the radial accelerations in terms of bearing forces become $$\begin{Bmatrix} r_{CA1} \\ r_{CA2} \end{Bmatrix} = \left(\frac{1}{m_A}\right) [M]^T \begin{Bmatrix} F_{Ra} \\ F_{Rb} \\ F_{Rc} \end{Bmatrix} \quad (22)$$

which, from equation (21), becomes $$\begin{Bmatrix} r_{CA1} \\ r_{CA2} \end{Bmatrix} = \quad (23)$$

$$\left(\frac{1}{m_A}\right) K_{BR}(K_{AR} + K_{RR}s)[M]^T\{g_{RC} - g_R\} + K_{mR}[M]^T\{g_R\}$$

To obtain the angular rate measurements it is assumed that the AMCD rim will be operated in a "centered" position about a nominal operating point. The gap command term in equation (18) would be zero in this case and the equation can written as $$[A]\begin{Bmatrix} \theta_A \\ r_{CA3} \end{Bmatrix} = -(K_B K_R s + [K_B K_A - K_m])[T]^T\{g_X\} \quad (24)$$

For the purposes of simplification, the following definitions are made $$\begin{pmatrix} \overline{K}_R \triangleq K_B K_R \\ \overline{K}_A \triangleq [K_B K_A - K_m] \end{pmatrix} \quad (25)$$

Using these definitions and the transformation of equation (3), equation (24) becomes $$[A]\begin{Bmatrix} \theta_A \\ r_{CA3} \end{Bmatrix} = -(\overline{K}_R s + \overline{K}_A)[T]^T[T]\begin{Bmatrix} \theta_{AS} \\ r_{CAS3} \end{Bmatrix} \quad (26)$$

Equation (26) rearranged and expanded becomes $$\begin{pmatrix} I_A s^2 \theta_{A1} + H_A s \theta_{A2} + 1.5 r_m^2(\overline{K}_R s + \overline{K}_A)\theta_{AS1} = 0 \\ I_A s^2 \theta_{A2} - H_A s \theta_{A1} + 1.5 r_m^2(\overline{K}_R s + \overline{K}_A)\theta_{AS2} = 0 \\ m_A s^2 r_{CA3} + 3(\overline{K}_R s + \overline{K}_A)r_{CAS3} = 0 \end{pmatrix} \quad (27)$$

Substituting from equation (4) results in $$\begin{pmatrix} I_A s^2(\theta_{AS1}+\theta_{S1})+H_A s(\theta_{AS2}+\theta_{S2})+1.5 r_m^2(\overline{K}_R s+\overline{K}_A)\theta_{AS1} = 0 \\ I_A s^2(\theta_{AS2}+\theta_{S2})-H_A s(\theta_{AS1}+\theta_{S1})+1.5 r_m^2(\overline{K}_R s+\overline{K}_A)\theta_{AS2} = 0 \\ m_A s^2(r_{CAS3}+r_{CS3})+3(\overline{K}_R s+\overline{K}_A)r_{CAS3} = 0 \end{pmatrix} \quad (28)$$

Solving for $\theta_{AS1}$ gives $$\theta_{AS1} = \frac{-H_A s \theta_{S2} - H_A s \theta_{AS2} - I_A s^2 \theta_{S1}}{I_A s^2 + 1.5 r_m^2 \overline{K}_R s + 1.5 r_m^2 \overline{K}_A} \quad (29)$$

The term $s\theta_{S2}$ represents the spacecraft rate, $\Omega_{S2}$, about the 2 axis and the term $s\theta_{AS2}$ represents the relative rate between the AMCD rim and spacecraft about the 2 axis. The relative rate between rim and spacecraft is a transient term and its effects can be minimized by proper selection of magnetic bearing control loop parameters (i.e., $\overline{K}_R$ and $\overline{K}_A$). The term $I_A s^2 \theta_{S1}$ represents a torque on the rim due to a spacecraft acceleration about the 1 axis. This term represents an error torque which is characteristic of rate gyros. The terms $H_A s \theta_{AS2}$ and $I_A s^2 \theta_{S1}$ can be lumped together as an error torque $G_{\epsilon 1}$. Equation (29) can then be written as $$\theta_{AS1} = \frac{-H_A \Omega_{S2} - G_{\epsilon 1}}{I_A s^2 + 1.5 r_m^2 \overline{K}_R s + 1.5 r_m^2 \overline{K}_A} \quad (30)$$

Assuming negligible errors the steady state response of equation (30) becomes $$\theta_{AS1} = -\left(\frac{H_A}{1.5 r_m^2 \overline{K}_A}\right) \Omega_{S2} \quad (31)$$

Solving for $\theta_{AS2}$ in a similar fashion results in $$\theta_{AS2} = \frac{H_A \Omega_{S1} + G_{\epsilon 2}}{I_A s^2 + 1.5 r_m^2 \overline{K}_R s + 1.5 r_m^2 \overline{K}_A} \quad (32)$$

which has a steady state response of (neglecting errors)

$$\theta_{AS2} = \left(\frac{H_A}{1.5 r_m^2 \overline{K}_A}\right) \Omega_{S1} \quad (33)$$

Turning next to $r_{CAS3}$ $$r_{CAS3} = \frac{-m_A s^2 r_{CS3}}{m_A s^2 + 3\overline{K}_R s + 3\overline{K}_A} \quad (34)$$

where $s^2 r_{CS3}$ represents the spacecraft acceleration, $a_{S3}$, along the 3 axis. Equation (34) has a steady state response given by $$r_{CA3} = -\left(\frac{m_A}{3\overline{K}_A}\right) a_{S3} \quad (35)$$

Figure 4:
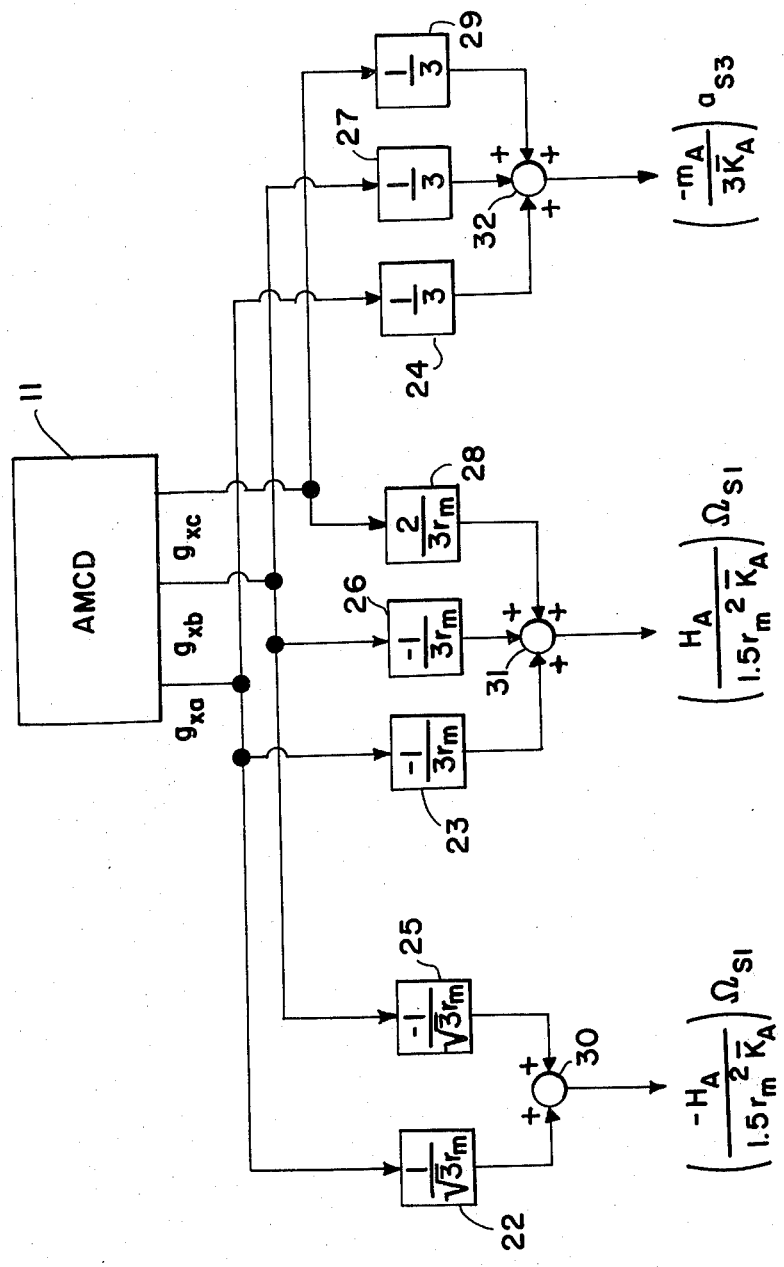
FIG. 4 is a block diagram of a computer for computing the angular rates about first and second mutually perpendicular axes in the plane of the AMCD rim and for computing the linear acceleration along a third axis perpendicular to the first and second axes.

The block diagram in FIG. 4 is the part of the invention for generating signals proportional to the angular rates about the 1 and 2 axes and acceleration along axis 3. The AMCD 11 is strapped down on the spacecraft. The position sensor 18 output $g_{Xa}$ at magnetic bearing station a is applied to analog operational amplifiers 22, 23 and 24. These operational amplifiers multiply the $g_{Xa}$ signal by the constants $1/\sqrt{3}r_m$, $-1/3r_m$, and $\frac{1}{3}$, respectively. The position sensor 18 output $g_{Xb}$ at magnetic bearing station b is applied to operational amplifiers 25, 26, and 27. These operational amplifiers multiply the $g_{Xb}$ signal by the constants $-1/\sqrt{3}r_m$, $-1/3r_m$, and $\frac{1}{3}$, respectively. The position sensor 18 output $g_{Xc}$ at magnetic bearing station c is applied to operational amplifiers 28 and 29. These operational amplifiers multiply the $g_{Xc}$ signal by the constants $2/3r_m$, and $\frac{1}{3}$, respectively. The outputs of operational amplifiers 22 and 25 are summed by an analog adder 30 to produce a signal proportional to the angular rate about axis 2; the outputs of operational amplifiers 23, 26 and 28 are summed by an analog adder 31 to produce a signal proportional to the angular rate about axis 1; and the outputs of operational amplifiers 24, 27 and 29 are summed by an analog adder 32 to produce a signal proportional to the linear acceleration along axis 3.

The radial position sensor 19 outputs can be used to determine spacecraft accelerations along the 1 and 2 axes in a manner similar to that of obtaining acceleration along the 3 axis with the axial sensors. Assuming a rim centered mode, equation (23) can be written as $$\left\{ \begin{array}{c} m_A s^2 r_{CA1} \\ m_A s^2 r_{CA2} \end{array} \right\} = -(\bar{K}_{RR}s + \bar{K}_{AR})[M]^T \{g_R\} \tag{36}$$

where $\bar{K}_{RR}=K_{BR}K_{RR}$ and $\bar{K}_{AR}=(K_{BR}K_{AR}-K_{MR})$. Making the substitution $$\{g_R\} = [M]\left\{ \begin{array}{c} r_{CAS1} \\ r_{CAS2} \end{array} \right\},$$

equation (36) expanded becomes $$\left( \begin{array}{c} m_A s^2 r_{CA1} = -(\bar{K}_{RR}s + \bar{K}_{AR})r_{CAS1} \\ m_A s^2 r_{CA2} = -(\bar{K}_{RR}s + \bar{K}_{AR})r_{CAS2} \end{array} \right) \tag{37}$$

Substituting from equation (6) and rearranging terms results in $$\left( \begin{array}{c} m_A s^2 + \bar{K}_{RR}s + \bar{K}_{AR})r_{CAS1} = -m_A s^2 r_{CS1} \\ m_A s^2 + \bar{K}_{RR}s + \bar{K}_{AR})r_{CAS2} = -m_A s^2 r_{CS2} \end{array} \right) \tag{38}$$

Solving for $r_{CAS1}$ gives $$r_{CAS1} = \frac{-m_A s^2 r_{CS1}}{m_A s^2 + \bar{K}_{RR}s + \bar{K}_{AR}} \tag{39}$$

where the term $s^2 r_{CS1}$ represents spacecraft acceleration, $a_{S1}$, along the 1 axis. Equation (39) has a steady state solution of $$r_{CAS1} = \left( \frac{-m_A}{\bar{K}_{AR}} \right) a_{S1} \tag{40}$$

Solving for $r_{CAS2}$ gives $$r_{CAS2} = \frac{-m_A s^2 r_{CS2}}{m_A s^2 + \bar{K}_{RR}s + \bar{K}_{AR}} \tag{41}$$

where the term $s^2 r_{CS2}$ represents spacecraft acceleration, $a_{S2}$, along the 2 axis. Equation (41) has a steady state response of $$r_{CAS2} = \left( \frac{-m_A}{\bar{K}_{AR}} \right) a_{S2} \tag{42}$$

Since $$\{g_R\} = [M]\left\{ \begin{array}{c} r_{CAS1} \\ r_{CAS2} \end{array} \right\} \tag{43}$$

then $$\left\{ \begin{array}{c} r_{CAS1} \\ r_{CAS2} \end{array} \right\} = [M]^{\#} \{g_R\} \tag{44}$$

where $[M]^{\#}$ represents the generalized inverse of $[M]$ and is defined as $$[M]^{\#} = ([M]^T [M])^{-1} [M]^T \tag{45}$$

where $[\ ]^{-1}$ is the inverse of $[\ ]$. Computing $[M]^{\#}$ yields $$[M]^{\#} = \begin{bmatrix} \tfrac{1}{3} & \tfrac{1}{3} & -\tfrac{2}{3} \\ 1/\sqrt{3} & -1/\sqrt{3} & 0 \end{bmatrix} \tag{46}$$

Figure 5:
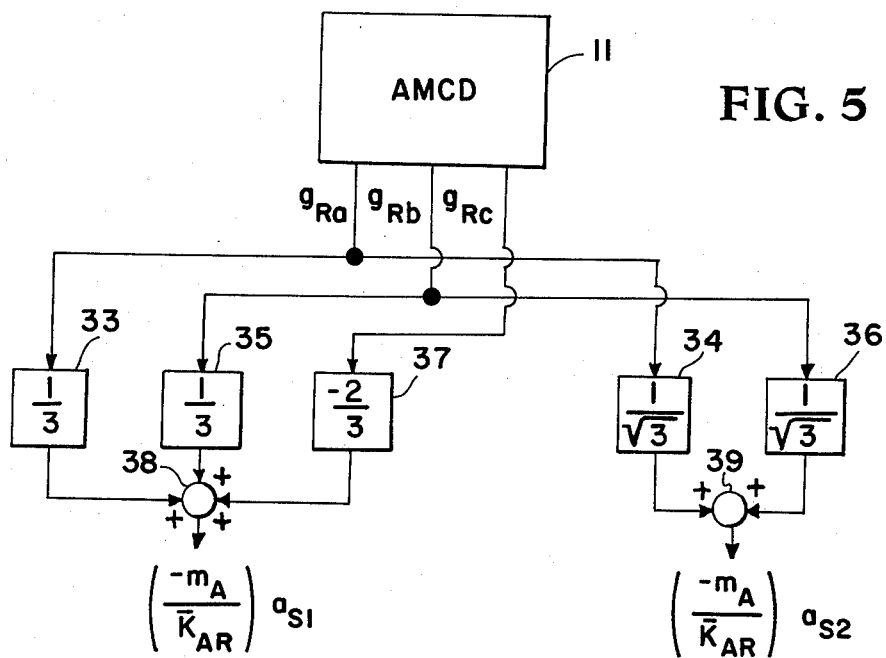
FIG. 5 is a block diagram of a computer for computing the linear accelerations along the first and second axes.

The block diagram in FIG. 5 of the part of the invention for obtaining the linear accelerations along axes 1 and 2 is obtained by using the above generalized inverse of $[M]$. The position sensor 19 output $g_{Ra}$ at magnetic bearing station a in AMCD 11 is applied to analog operational amplifiers 33 and 34. These operational amplifiers multiply the $g_{Ra}$ signal by the constants $\tfrac{1}{3}$ and $1/\sqrt{3}$, respectively. The position sensor 19 output $g_{Rb}$ at magnetic bearing station b is applied to analog operational amplifiers 35 and 36. These operational amplifiers multiply the $g_{Rb}$ signal by the constants $\tfrac{1}{3}$ and $1/\sqrt{3}$, respectively. The position sensor 19 output $g_{Rc}$ at magnetic bearing station c is applied to an operational amplifier 37 which multiplies the $g_{Rc}$ signal by a constant $-\tfrac{2}{3}$. The outputs of operational amplifiers 33, 35 and 37 are summed by an analog adder 38 to produce a signal proportional to the linear acceleration along axis 1; and the outputs of operational amplifiers 34 and 36 are summed by an analog adder 39 to produce a signal proportional to the linear acceleration along axis 2.

In the operation of this invention, the AMCD 11 is strapped down on the spacecraft. Thereafter the spacecraft motions causes the AMCD to generate the signals $g_{Xa}$, $g_{Xb}$, $g_{Xc}$, $g_{Ra}$, $g_{Rb}$, and $g_{Rc}$. These signals are applied to the computing means in FIGS. 4 and 5 to generate a signal at the output of adder 30 proportional to the angular rate about axis 2; a signal at the output of adder 31 proportional to the angular rate about axis 1; a signal at the output of adder 32 proportional to the linear acceleration along axis 3; a signal at the output of adder 38 proportional to the linear acceleration along axis 1; and a signal at the output of adder 39 proportional to the linear acceleration along axis 2.

The advantages of this invention are numerous. It uses one element for measuring angular rates and linear accelerations; and it uses an AMCD as the basic sensor with attendant advantages of high momentum-to-mass ratio, low volume, topological advantages (i.e., electronics, can be packaged inside the rim and multiple rims can be nested), simplicity, reliability, zero-friction, zero breakout forces, and zero wear.

It is to be understood that the form of the invention herewith shown and described is to be taken as a preferred embodiment. Various changes may be made without departing from the invention. For example, other analog elements could be used in place of the analog operational amplifiers; digital computing means could be used in place of the analog computing means shown in FIGS. 4 and 5; means other than what is shown could be used to spin rim 12; more than three magnetic bearing stations could be used; bearing forces could be used to compute the desired rates and accelerations (bearing force can be determined from current and gap information); and the invention can be used by aircraft or vehicles other than a spacecraft in a nonzero gravity environment by subtracting the bearing forces required to support the weight of the rim.

What is claimed is:

1. An inertial measuring system for measuring the angular rate of a vehicle about two mutually perpendicular axes comprising:
    a rim attached to said vehicle such that the plane of said rim is parallel to the plane of said two axes;
    several magnetic bearing elements located around said rim for magnetically suspending said rim;
    means for spinning said rim;
    each of said magnetic bearing elements including means for controlling the position of said rim in the axial and radial directions the last mentioned means including means for producing a signal proportional to the movements of the rim in the axial direction; and
    computer means receiving said signals proportional to the movement of the rim in the axial direction from each of said several magnetic bearing elements for producing the angular rates of said vehicle about said two mutually perpendicular axes.

2. An inertial measuring system according to claim 1 wherein said computer means produces the two angular rates in accordance with the following mathematical expressions:

$$\frac{g_{Xa}}{\sqrt{3}\, r_m} - \frac{g_{Xb}}{\sqrt{3}\, r_m}$$

and $$\frac{2g_{Xc}}{3r_m} - \frac{g_{Xa}}{3r_m} - \frac{g_{Xb}}{3r_m}$$

where $g_{Xa}$, $g_{Xb}$, and $g_{Xc}$ are signals proportional to the movements of the rim in the axial direction and $r_m$ is the radius of said rim.

3. An inertial measuring system according to claim 1 wherein said computer means includes means for producing the acceleration of said vehicle along an axis perpendicular to the plane of said two axes.

4. An inertial measuring system according to claim 3 wherein said computer means produces the acceleration of the vehicle along an axis perpendicular to the plane of said two axes in accordance with the following mathematical expression:

$$\tfrac{1}{3}(g_{Xa}+g_{Xb}+g_{Xb})$$

where $g_{Xa}$, $g_{Xb}$ and $g_{Xc}$ are signals proportional to the movements of the rim in the axial direction.

5. An inertial measuring system according to claim 3 wherein each of said magnetic bearing elements includes means for producing a signal proportional to the movement of the rim in the radial direction relative to the vehicle, and second computer means receiving said signal proportional to the movement of the rim in the radial direction from each of said magnetic bearing elements for producing the acceleration of said vehicle along said two axes.

6. An inertial measuring system according to claim 5 wherein said second computer means produces the acceleration of said vehicle along said two axes in accordance with the following mathematical expressions:

$$\tfrac{1}{3}(g_{Ra} + g_{Rb} - 2g_{Rc})$$

and $$\frac{1}{\sqrt{3}}(g_{Ra} + g_{Rb})$$

where $g_{Ra}$, $g_{Rb}$ and $g_{Rc}$ are signals proportional to the movements of the rim in the radial direction.

7. A system for measuring the acceleration of a vehicle along two mutually perpendicular axes comprising:
    a rim attached to said vehicle such that the plane of said rim is parallel to the plane of said two axes;
    several magnetic bearing means located around said rim for magnetically suspending said rim;
    means for spinning said rim;
    each of said magnetic bearing means including means for controlling the position of said rim in the axial and radial directions and producing a signal proportional to the movement of the rim in the radial direction; and
    computer means receiving said signal proportional to the movement of the rim in the radial direction from each of said magnetic bearing means for producing the linear accelerations of said vehicle along said two axes.

8. A system for measuring acceleration in accordance with claim 7 wherein said computer means produces the linear acceleration in accordance with the following mathematical expressions:

$$\tfrac{1}{3}(g_{Ra} + g_{Rb} - 2g_{Rc})$$

and $$\frac{1}{\sqrt{3}}(g_{Ra} + g_{Rb})$$

where $g_{Ra}$, $g_{Rb}$ and $g_{Rc}$ are signals proportional to the movements of the rim in the radial direction.

9. A system for measuring acceleration in accordance with claim 8 including means for measuring the linear acceleration of the vehicle along an axis perpendicular to said two axes comprising a second computer means receiving said signal proportional to the movement of the rim in the axial direction from each of said magnetic bearing means for producing the linear acceleration of said vehicle along said axis perpendicular to said two axes.

10. A system for measuring acceleration according to claim 9 wherein said second computer means produces linear acceleration in accordance with the following mathematical expressions:

$$\tfrac{1}{3}(g_{Xa}+g_{Xb}+g_{Xc})$$

where $g_{Xa}$, $g_{Xb}$ and $g_{Xc}$ are signals proportional to the movements of the rim in the axial direction.

* * * * *